Patented Apr. 17, 1951

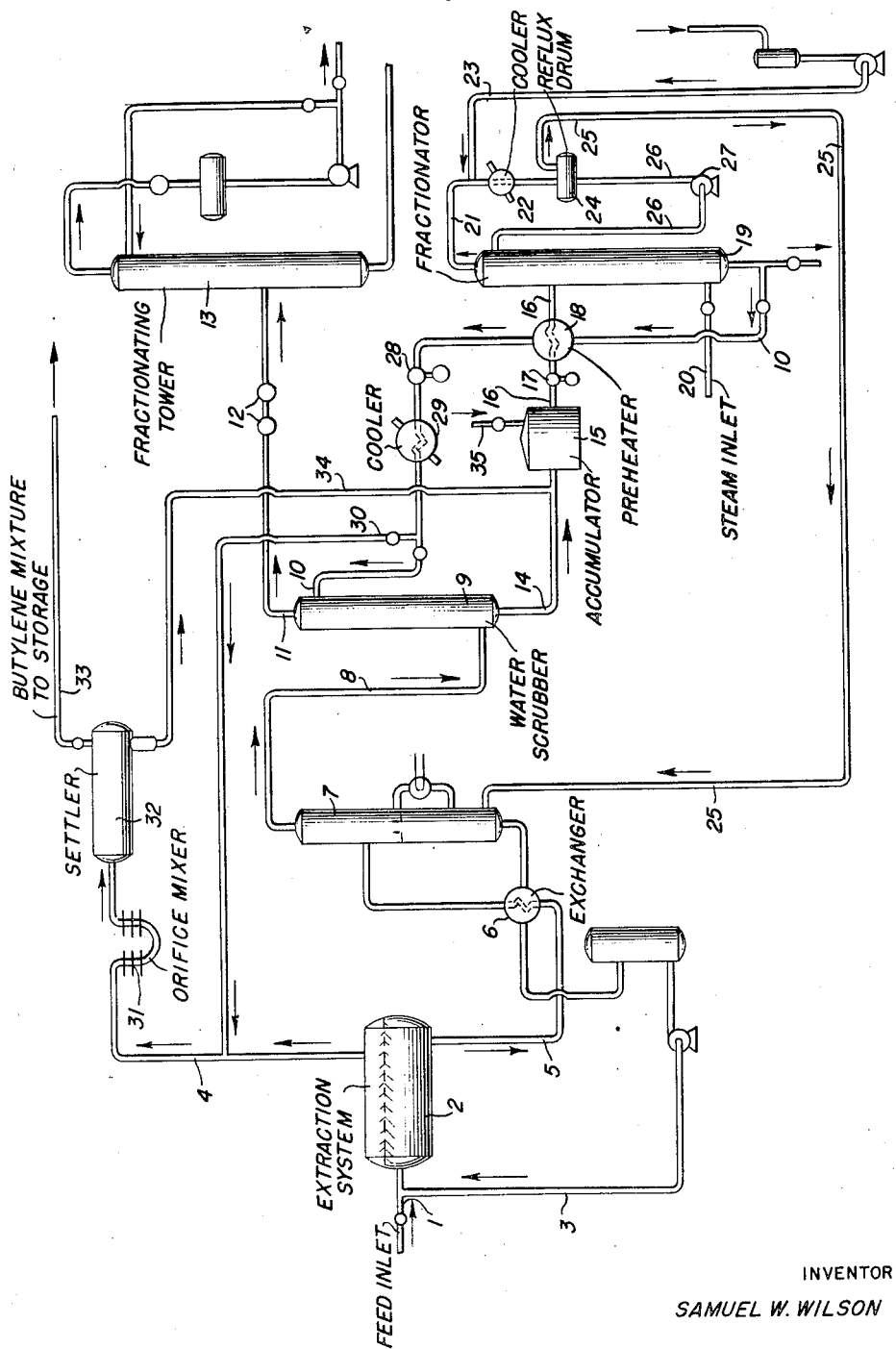

2,549,555

UNITED STATES PATENT OFFICE 2,549,555

RECOVERY OF AMMONIA FROM BUTADIENE-AMMONIA MIXTURE

Samuel W. Wilson, Baton Rouge, La., assignor to Standard Oil Development Company, a corporation of Delaware Application July 30, 1947, Serial No. 764,639

7 Claims. (Cl. 23—193)

This invention relates to a process for inhibiting or minimizing the formation of solid polymers in the ammonia recovery system of a plant wherein diolefins are separated and segregated from other hydrocarbons by use of ammoniacal cuprous ammonium acetate.

In the separation and segregation of diolefins from other hydrocarbons by absorption in and desorption from cuprous ammonium acetate solution, it is necessary to water wash both the product butadiene stream from the desorption step and the rejected hydrocarbon stream to recover the ammonia contained in these streams. The ammonia water is in turn preheated and then steam stripped in a fractionator to give a concentrated aqueous ammonia stream overhead which is returned to the cuprous ammonia acetate solution. In the washing operation to remove ammonia, appreciable quantities of butadiene and lesser amounts of other $C_4$ hydrocarbons are dissolved or entrained in the scrubbing waters. In the subsequent operations wherein the ammoniacal water is preheated prior to entering the ammonia fractionator, polymers showing a $C_4H_6$ carbon-hydrogen ratio are deposited on the tubes of the preheater and on the walls of the ammonia fractionator feed lines. The formation of these polymers which are present as a hard to medium hard scale varying from $\frac{1}{16}''$ to $\frac{1}{2}''$ in thickness results in the loss of plant capacity, ammonia recovery, and in the necessity for shutting down equipment for cleaning as well as requiring considerable cleaning during turn around periods.

According to this invention, by the addition of a phenolic antioxidant, such as tertiary butyl catechol, catechol, hydroquinone, and/or pyrogallol, to the ammonia recovery system and a small amount of caustic, the formation of these polymers is prevented resulting in improved operation and reduced operating and maintenance costs. Additional benefit may be otained in that addition of the phenolic antioxidant will remove any oxygen entering the system and thereby tend to decrease fouling in the subsequent butadiene rerunning operation.

The object of the invention is more fully understood on reading the following description with reference to the accompanying drawing. A hydrocarbon stream, gas or liquid, containing butadiene, isobutylene, normal butylene, and butane is passed by means of pipe 1 into a cuprous ammonium acetate extraction system 2 after mixing with lean cuprous ammonia acetate solution introduced through line 3. The unabsorbed hydrocarbons leave the extraction section through pipe 4 and the cuprous ammonium acetate solution with the absorbed butadiene is passed through pipe 5 and exchanger 6 into desorber 7 where the absorbed diolefin is rejected by heat. The desorbed gas containing butadiene and ammonia is passed through pipe 8 to a water scrubber 9 where the ammonia is removed by contacting with condensate introduced into said tower by means of pipe 10. The ammonia-free butadiene passes through pipe 11 to compressors 12 into a fractionating tower 13. The ammoniacal water plus some dissolved butadiene is withdrawn from the scrubber by means of pipe 14 and passed into accumulator 15 from where it is pumped through line 16, by means of pump 17, and preheater 18 into a fractionator 19 to which steam is added through line 20. A water soluble phenolic type antioxidant, such as tertiary butyl catechol, hydroquinone, pyrogallol, etc., is added by means of pipe 35 in accumulator 15 in concentrations as low as 10 parts per million, either as a solid or aqueous solution, although other points of introduction may be used. The concentrated ammonia is withdrawn through pipe 21 and passes through cooler 22 prior to which caustic soda is introduced through pipe 23 although other points of injection may be used. The concentrated aqueous ammonia passes to reflux drum 24 and the ammoniacal vapors from the reflux drum pass through line 25 to desorber 7. The aqueous phase is pumped back to top of fractionator 19, as reflux through line 26 by means of pump 27. The ammonia-free water from the ammonia stripper of fractionator 19, containing small amounts of caustic and inhibitor, passes through line 10 and heat exchanger 18, pump 28 and cooler 29 to butadiene scrubber 9 and through pipe 30 to the spent $C_4$ or butylene line 4. The mixture of spent $C_4$ and water passes through orifice mixer 31 into settler 32. The ammonia-free butylene mixture passes through line 33 to storage and the ammoniacal water passes through line 34 to accumulator 15.

By passing the antioxidant into the fractionator 19 (ammonium recovery tower), the formation of insoluble polymer is inhibited. Prior to the use of a water soluble phenolic type of antioxidant, for example hydroquinone, the ammonia feed preheaters and lines were badly fouled with insoluble polymer, requiring cleaning and resulting in ammonia losses during this period after as little as 60 days' operation. Where 30 parts per million hydroquinone in the scrubbing water has been maintained, runs in excess of 80 days without any evidence of polymer formation have been completed, and a run of 225 days was made with no evidence of fouling in the equipment being shown.

The concentration of the sodium hydroxide in the ammonia stripper bottom is maintained about 0.05 to 0.5 weight per cent. The concentration of the sodium hydroxide added is about 10%, and pH of the phenolic inhibitors in alkaline solutions is above 8. The equipment being of steel, or iron, generally contains one or more of ferric oxide, hydrated ferric oxide, ferrous oxide, ferric or ferrous hydroxide, or ferrous carbonate which act as catalysts in the formation of insoluble polymers of butadiene, or other diolefins. This formation of polymers is inhibited by initially washing the equipment with an aqueous solution of a phenolic type of antioxidant, i. e., tertiary butyl catechol, catechol, etc., preferably of pH value above 8.

I claim:

1. In the recovery of ammonia from a butadiene ammonia mixture obtained by desorbing an ammoniacal cuprous salt solution of the said butadiene, the improvement which comprises inhibiting the formation of polymers by scrubbing the desorbed butadiene ammonia in the gas phase with an aqueous alkaline solution having a pH above 8 of a phenolic compound selected from the group consisting of tertiary butyl catechol, catechol, hydroquinone and pyrogallol, separating the aqueous phenolic compound solution, passing the aqueous phenolic compound solution to a stripping column, heating it therein to drive off the ammonia and recycling the aqueous bottoms containing the phenolic compound after cooling to the butadiene ammonia scrubber.

2. In the recovery of ammonia from a butadiene and ammonia mixture obtained by desorbing an ammoniacal cuprous salt solution of the butadiene, the improvement which comprises inhibiting the formation of polymers by scrubbing the desorbed butadiene ammonia in the gas phase with an aqueous alkaline solution having a pH above 8, of a phenolic compound selected from the group consisting of tertiary butyl catechol, catechol, hydroquinone and pyrogallol passing the resulting aqueous ammonia phenolic compound solution to a stripping column, adding to the aqueous ammonia phenolic compound solution as it passes through the stripper a water soluble phenolic compound, heating the aqueous ammonia solution in the stripping column to drive out the ammonia, adding to the vapors of ammonia a 10% solution of caustic soda, separating the ammonia vapors and refluxing a condensate to the upper part of the stripping column, and recycling the aqueous bottoms containing the alkaline phenolic compound, after cooling, to the butadiene ammonia scrubber.

3. In the recovery of ammonia from a butadiene ammonia mixture according to claim 2, the soluble phenolic compound is tertiary butyl catechol.

4. In the recovery of ammonia according to claim 2, the phenolic compound is hydroquinone.

5. In the recovery of ammonia according to claim 2, in which the phenolic compound is pyrogallol.

6. In the recovery of ammonia obtained by scrubbing a mixture of butadiene and ammonia that had been desorbed from a cuprous ammonium acetate solution containing butadiene, the improvement which comprises scrubbing the butadiene ammonia mixture with an aqueous solution of sodium hydroxide and a phenolic compound selected from the group consisting of tertiary butyl catechol, catechol, hydroquinone and pyrogallol, separating the aqueous solution, and heating in a fractionating column to obtain overhead the ammonia, mixing the ammonia vapors with a 10% solution of sodium hydroxide, cooling, separating the ammonia and recycling to the desorber, where the ammonia and butadiene is separated from the cuprous ammonium acetate solution, refluxing the aqueous solution separated from the ammonia, to the stripping column, and recycling the aqueous bottoms of sodium hydroxide and phenolic compound to scrub the butadiene ammonia solution.

7. In the recovery of ammonia according to claim 6 the solution of caustic soda and phenolic compound used in scrubbing a butadiene ammonia solution has a pH above 8.

SAMUEL W. WILSON.

REFERENCES CITED

The following references are of record in the file of this patent:

UNITED STATES PATENTS

| Number | Name | Date |
|---|---|---|
| 2,395,956 | Soday | Mar. 5, 1946 |
| 2,401,896 | Asbury | June 11, 1946 |
| 2,402,113 | Hatch | June 11, 1946 |
| 2,417,048 | Antonio | Mar. 11, 1947 |
| 2,430,972 | Black | Nov. 18, 1947 |